United States Patent [19]
Weder

[11] Patent Number: 6,047,524
[45] Date of Patent: *Apr. 11, 2000

[54] METHOD OF ATTACHING A SLEEVE TO A POT

[75] Inventor: Donald E. Weder, Highland, Ill.

[73] Assignee: Southpac Trust International, Inc.

[*] Notice: This patent is subject to a terminal disclaimer.

[21] Appl. No.: 09/162,479

[22] Filed: Sep. 28, 1998

Related U.S. Application Data

[63] Continuation of application No. 08/872,772, Jun. 10, 1997, Pat. No. 5,813,194, which is a continuation of application No. 08/701,818, Aug. 23, 1996, Pat. No. 5,735,103, which is a continuation of application No. 08/220,852, Mar. 31, 1994, Pat. No. 5,572,851.

[51] Int. Cl.$^7$ .................................................. B65B 25/02
[52] U.S. Cl. .................. 53/399; 53/397; 53/412
[58] Field of Search ........................... 53/399, 397, 412, 53/465, 461, 419, 464, 390, 133.3, 219; 206/423

[56] References Cited

U.S. PATENT DOCUMENTS

| | | | |
|---|---|---|---|
| Re. 21,065 | 5/1939 | Copeman | 93/2 |
| D. 259,333 | 5/1981 | Charbonneau | D9/306 |
| D. 279,279 | 6/1985 | Wagner | D11/143 |
| D. 301,991 | 7/1989 | Van Sant | D11/149 |
| D. 335,105 | 4/1993 | Ottenwalder et al. | D11/164 |
| D. 368,025 | 3/1996 | Sekerak et al. | D9/305 |
| 524,219 | 8/1894 | Schmidt . | |
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks . | |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87 |

(List continued on next page.)

FOREIGN PATENT DOCUMENTS

| | | |
|---|---|---|
| 4231978 | 6/1979 | Australia . |
| 0050990 | 5/1982 | European Pat. Off. . |
| 0791543 | 8/1997 | European Pat. Off. . |
| 1376047 | 9/1964 | France . |
| 2036163 | 12/1970 | France . |
| 2137325 | 12/1972 | France . |
| 2272914 | 12/1975 | France . |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

"Super Seller", Supermarket Floral, Sep. 15, 1992.

(List continued on next page.)

*Primary Examiner*—James F. Coan
*Attorney, Agent, or Firm*—Dunlap, Codding, & Rogers, P.C.

[57] ABSTRACT

A plant package assembly, comprising a pot containing a floral grouping and a flexible sleeve having detaching elements at preselected areas, the sleeve further comprising a bonding material which connects the sleeve to the pot when the pot is positioned within the sleeve, the sleeve being positioned about the pot and a lower portion of the sleeve closely surrounding and encompassing the pot, an upper portion of the sleeve extending upwardly from the pot and substantially surrounding and encompassing the floral grouping contained within the pot, at least a portion of the sleeve being removable via the detaching elements, leaving a portion of the sleeve which is a decorative plant cover.

22 Claims, 8 Drawing Sheets

U.S. PATENT DOCUMENTS

| | | | |
|---|---|---|---|
| 2,170,147 | 8/1939 | Lane | 206/56 |
| 2,200,111 | 5/1940 | Bensel | 229/1.5 |
| 2,278,673 | 4/1942 | Savada et al. | 154/43 |
| 2,302,259 | 11/1942 | Rothfuss | 41/10 |
| 2,323,287 | 7/1943 | Amberg | 229/53 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/58 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,248,347 | 2/1981 | Trimbee | 206/423 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/8.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,105,599 | 4/1992 | Weder | 53/399 |
| 5,111,638 | 5/1992 | Weder | 156/212 |
| 5,120,382 | 6/1992 | Weder | 53/397 |
| 5,152,100 | 10/1992 | Weder et al. | 47/73 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder | 29/469.5 |
| 5,307,606 | 5/1994 | Weder | 53/410 |
| 5,315,785 | 5/1994 | Avôt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,526,932 | 6/1996 | Weder | 206/423 |
| 5,572,851 | 11/1996 | Weder | 53/399 |
| 5,575,133 | 11/1996 | Weder et al. | 53/397 |
| 5,617,703 | 4/1997 | Weder | 53/413 |
| 5,624,320 | 4/1997 | Martinez | 472/51 |
| 5,647,168 | 7/1997 | Gilbert | 47/72 |
| 5,813,194 | 9/1998 | Weder | 53/399 |

FOREIGN PATENT DOCUMENTS

| | | | |
|---|---|---|---|
| 2489126 | 3/1982 | France . | |
| 2610604 | 8/1988 | France . | |
| 2619698 | 3/1989 | France . | |
| 345464 | 12/1921 | Germany . | |
| 513971 | 11/1930 | Germany . | |
| 1166692 | 3/1964 | Germany . | |
| 2060812 | 11/1971 | Germany . | |
| 3829281 | 5/1989 | Germany . | |
| 3911847 | 10/1990 | Germany | 47/72 |
| 542958 | 2/1993 | Japan . | |
| 8301709 | 12/1984 | Netherlands . | |
| 1000658 | 6/1995 | Netherlands . | |
| 560532 | 4/1975 | Switzerland . | |
| 1204647 | 9/1970 | United Kingdom . | |
| 2056410 | 3/1981 | United Kingdom . | |
| 2074542 | 11/1981 | United Kingdom . | |
| 2128083 | 4/1984 | United Kingdom . | |
| 2252708 | 8/1992 | United Kingdom . | |
| 9315979 | 8/1993 | WIPO . | |

OTHER PUBLICATIONS

"Halloween", Link Magazine, Sep. 1992, 2 pages.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec. 1996, 2 pages.

"Derwent Abstract" of FR 2610604A. It is noted that the abstract is an incorrect English translation of the contents of the French patent. The French patent does not enable or disclose adhesively attaching the covering to the container. 1988.

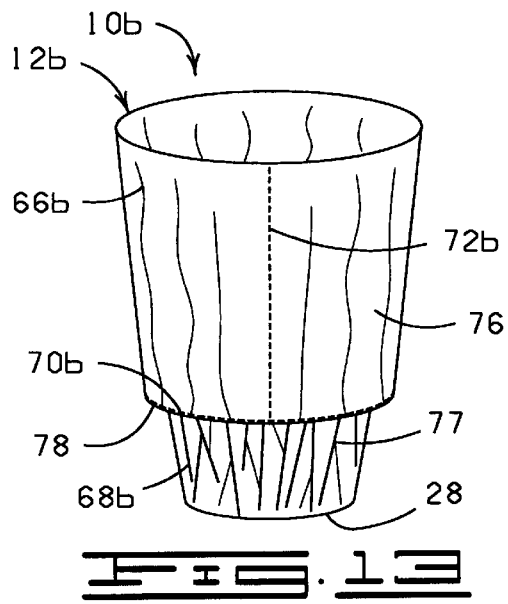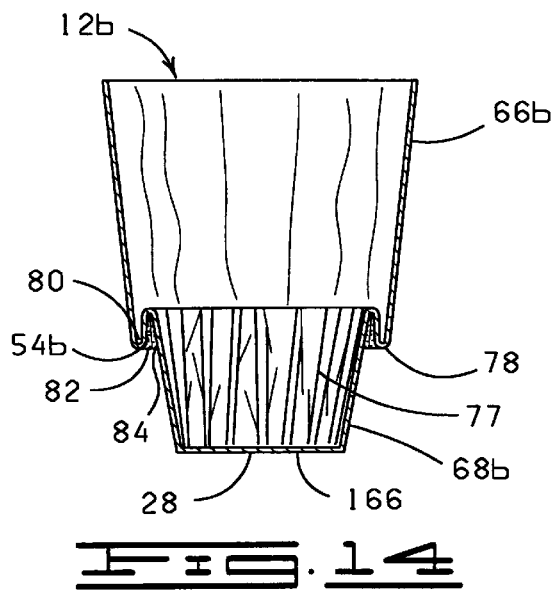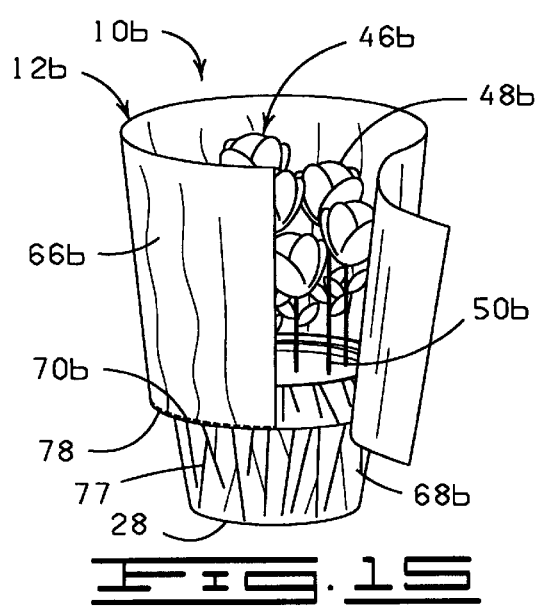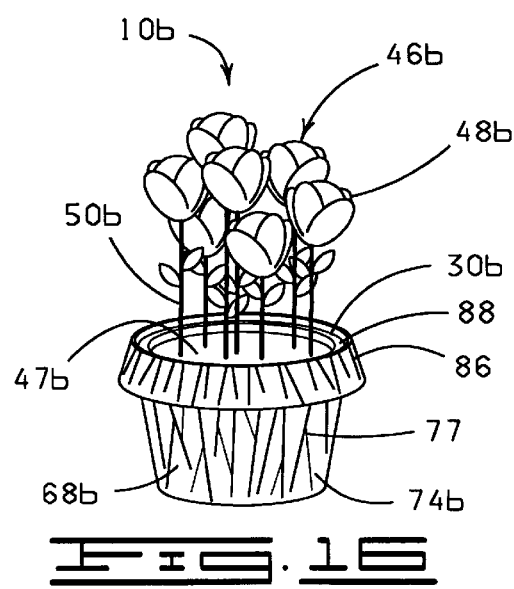

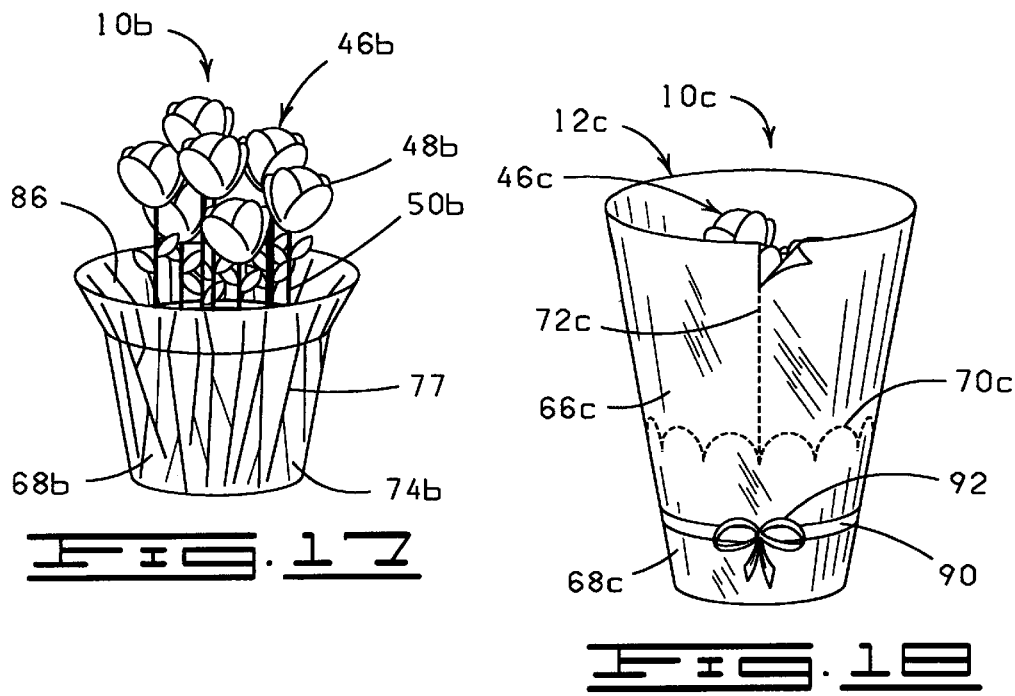
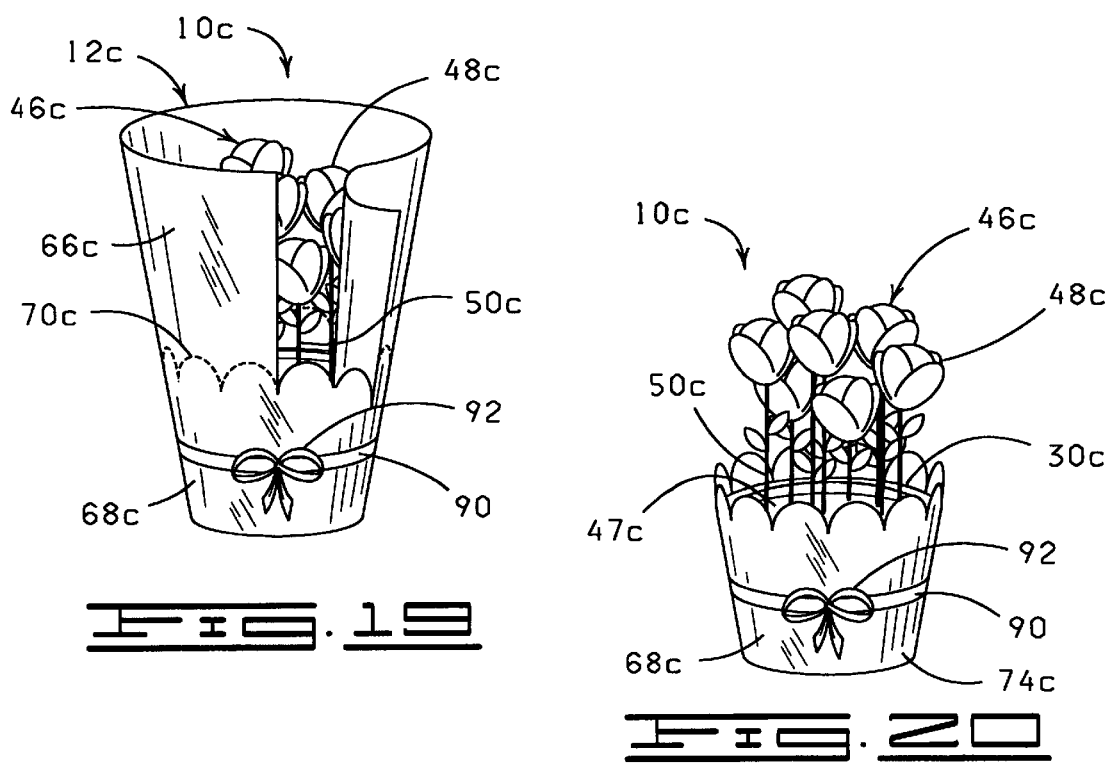

METHOD OF ATTACHING A SLEEVE TO A POT

This application is a continuation of U.S. Ser. No. 08/872,772 filed Jun. 10, 1997, which will issue as U.S. Pat. No. 5,813,194 on Sep. 29, 1998 and which is a continuation of U.S. Ser. No. 08/701,818, filed Aug. 23, 1996, now U.S. Pat. No. 5,735,103, which is a continuation of U.S. Ser. No. 08/220,852, filed Mar. 31, 1994, now U.S. Pat. No. 5,572,851.

FIELD OF THE INVENTION

This invention generally relates to packaging materials, and, more particularly, packaging materials used to wrap flower pots containing floral groupings and/or mediums containing floral groupings, and methods of using same.

BRIEF DESCRIPTION OF THE DRAWINGS

FIG. 13 is a perspective view of a modified plant package, showing a sleeve having a circumferential overlapping fold and a closed bottom.

FIG. 14 is a transverse view of the plant package of FIG. 13, but showing the circumferential overlapping fold and the bonding material connecting at least a portion of the circumferential overlapping fold together.

FIG. 15 is a perspective view of the plant package of FIG. 13, showing the upper portion of the sleeve being detached from the lower portion via both the vertical perforations in the upper portion and circumferential perforations.

FIG. 16 is a perspective view of the plant package of FIG. 13, but showing the upper portion of the sleeve detached, and showing the remaining lower portion of the sleeve with a skirt attached to the opening, the skirt angle extending downward and outward.

FIG. 17 is a perspective view of the plant package of FIG. 16, but showing the skirt angle extending upwardly and outwardly.

FIG. 18 is a perspective view of a modified plant package similar to the plant package of FIGS. 11 and 12 but showing a scalloped design along the circumferential perforations, and showing a ribbon having a bow, the ribbon extending around the sleeve.

FIG. 19 is a perspective view of the plant package of FIG. 18, but showing the upper portion of the sleeve being removed.

FIG. 20 is a perspective view of the plant package of FIG. 18, but showing the remaining lower portion forming a decorative plant cover with a scalloped edge.

DESCRIPTION OF THE PREFERRED EMBODIMENTS

The Embodiments and Methods of Use of FIGS. 1–10

Figure 1:
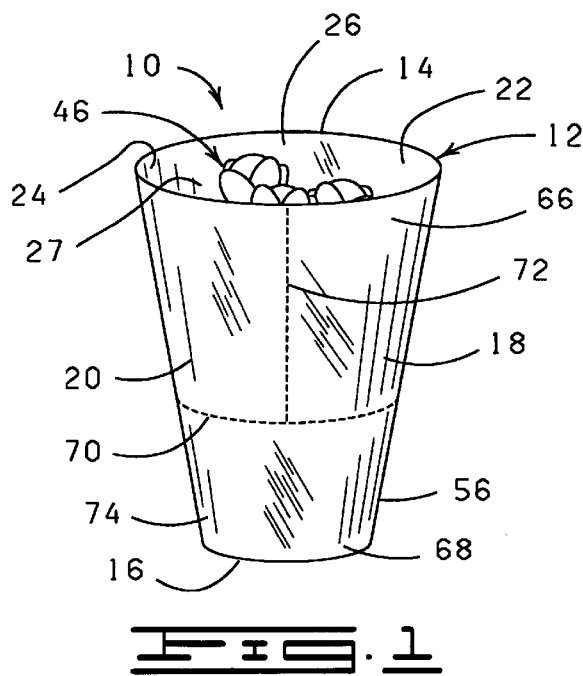
FIG. 1 is a perspective view of a plant package constructed in accordance with the present invention, showing a sleeve having both vertical and circumferential perforations therein, the circumferential perforations dividing the sleeve into an upper portion and a lower portion.

Shown in FIG. 1 and designated therein by the general reference numeral 10 is a plant package. The plant package 10 comprises a sleeve 12 which is generally tubular in shape. The sleeve 12 has a first end 14, a second end 16, an outer periphery 18 forming an outer surface 20, and an opening 22, intersecting both the first end 14 and the second end 16, forming an inner surface 24 and is defined by an inner periphery 26 and providing a retaining space 27 therein. In some embodiments (shown in FIGS. 13–18, and discussed in detail below), the second end 16 is closed, forming a closed base, and the opening 18 only intersects the first end 12 of the plant package 10. Equipment and devices for forming sleeves are commercially available, and well known in the art.

Figure 2:
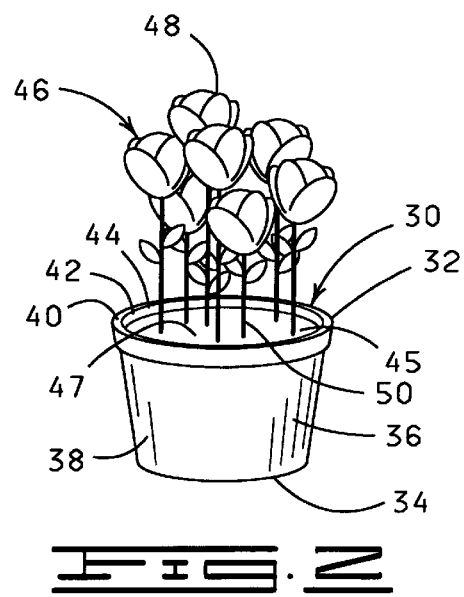
FIG. 2 is a perspective view of a pot having a growing medium therein, a floral grouping being disposed into the growing medium within the pot.

The plant package 10 may also contain a pot 30 (FIG. 2). The pot has an upper end 32, a lower end 34, and an outer periphery 36 forming an outer surface 38. An opening 40 intersects the upper end 32, forming an inner surface 42 and is defined by an inner periphery 44. The lower end 34 of the pot 30 is closed, therefore a pot retaining space 45 is formed and is defined by the inner surface 42 and closed lower end 34. The term "pot" refers to any type of container used for holding a floral grouping or a potted plant. Examples of pots, used in accordance with the present invention include, but not by way of limitation, clay pots, wooden pots, plastic pots, and the like. The pot 30 is adapted to receive a floral grouping 46 in the pot retaining space 45.

The plant package 10 also comprises a floral grouping 46 (FIG. 2). The floral grouping 46 may be disposed in the opening 40 in the pot 30, in the pot retaining space 45 along with suitable growing medium 47, which will be described in further detail below, or other retaining medium, such as but not by way of limitation, a floral foam. It will also be understood that the floral grouping 46, and any appropriate growing medium 47 or other retaining medium may be disposed in the plant package 10 without a pot 30. The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping 46. The floral grouping 46 comprises a bloom or foliage portion 48 and a stem portion 50. Further, the floral grouping 46 may comprise a growing potted plant having a root portion (not shown) as well. However, it will be appreciated that the floral grouping 46 may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

Figure 3:
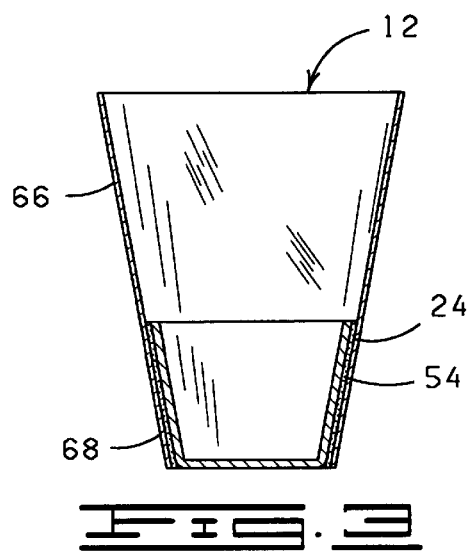
FIG. 3 is a transverse view of the plant package of FIG. 1, showing the sleeve having a bonding material connected to the inner surface of the sleeve, and a pot contained within the sleeve, the bonding material connecting the pot to the inner surface of the sleeve.
Figure 4:
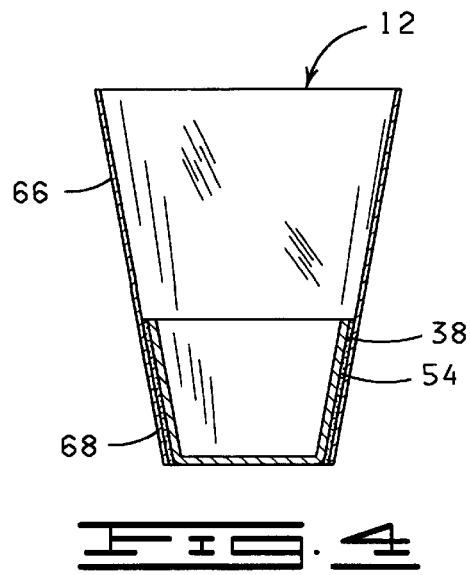
FIG. 4 is a transverse view of a the plant package of FIG. 1, showing the sleeve having a bonding material connected to the outer surface of a pot, the bonding material connecting the outer surface of the pot to the inner surface of the sleeve.
Figure 5:
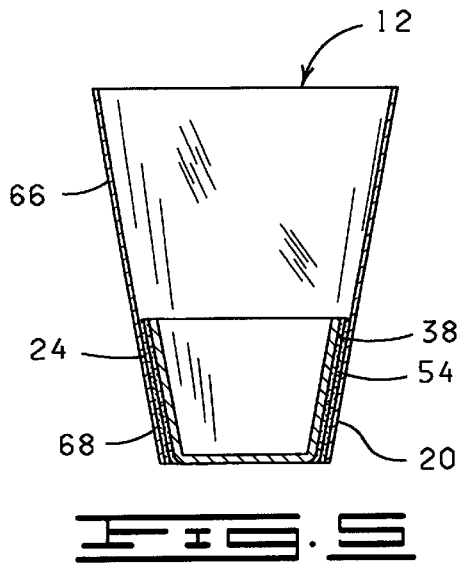
FIG. 5 is a transverse view of a the plant package of FIG. 1, showing a sleeve having a bonding material connected to the inner surface and a pot having a bonding material connected to the outer surface, both bonding materials cooperating to connect the outer surface of the pot and the inner surface of the sleeve together.

A bonding material 54 (FIGS. 3–5) may be disposed on at least a portion of the inner surface 24 of the sleeve 12, as shown in FIG. 3, or, alternatively, the bonding material 54 may be disposed on the outer surface 38 of a pot 30 contained within the sleeve 12, as illustrated in FIG. 4, while the sleeve 12 may be free of the bonding material 54. In a further alternative, the bonding material 54 may be disposed both on at least a portion of the pot 30 as well as upon at least a portion of the inner surface 24 of the sleeve 12, as shown in FIG. 5. In addition, a portion of the bonding material 54 may also be disposed on the outer surface 20 of the sleeve 12 as well (not shown). It will be understood that the bonding material 54 may be disposed in a solid section of bonding material 54, as shown in FIG. 3 for example. The bonding material 54 may also be disposed upon either the outer surface 20 or the inner surface 24 of the sleeve 12, as well as upon the pot 30. Further, the bonding material 54 may be disposed in strips of bonding material 54, spots of bonding material 54, or in any other geometric, non-geometric, asymmetric, or fanciful form, and in any pattern including covering either the entire surface of the sleeve 12 and/or the pot 30. The bonding material 54 is disposed on the sleeve 12 and/or pot 30 by any means known in the art.

The sleeve 12 is generally tubularly shaped, but the sleeve 12 may be, by way of example but not by way of limitation, cylindrical, frusto-conical, or a combination of both frusto-conical and cylindrical (not shown). Further, as long as a generally tubular shape is maintained in at least a portion of the sleeve 12, any shape, whether geometric, non-geometric, asymmetrical and/or fanciful may be utilized. The sleeve 12 may also be equipped with drains or ventilation holes (not shown), or can be made from permeable or impermeable materials.

The sleeve 12 has a thickness in a range from about 0.1 mils to about 30 mils. Often, the thickness of the sleeve 12 is in a range from about 0.5 mils to about 10 mils. Preferably, the sleeve 12 has a thickness in a range from about 0.1 mils to about 5 mils. The sleeve 12 is constructed of a material 56 which is flexible.

The sleeve 12 may be constructed of a single layer of material 56 or a plurality of layers of the same or different types of materials 56. Any thickness of the material 56 may be utilized in accordance with the present invention as long as the material 56 is wrappable about an object, such as a floral grouping 46 or pot 30, as described herein. The layers of material 56 comprising the sleeve 12 may be connected together or laminated or may be separate layers. Materials 56 used to construct the sleeve 12 are described in U.S. Pat. No. 5,111,637 entitled "Method For Wrapping A Floral Grouping" issued to Weder et al., on May 12, 1992, which is hereby incorporated herein by reference.

As noted earlier, a bonding material 54 may be disposed on at least a portion of at least one surface of the sleeve 12. The bonding material 54 may be applied as a strip or as spots or other shapes, as described above. One method for disposing a bonding material 54, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or means" when used herein means an adhesive, frequently a pressure sensitive adhesive, or a cohesive. Where the bonding material is a cohesive, a similar cohesive material must be placed on the adjacent surface for bondingly contacting and bondingly engaging with the cohesive material. The term "bonding material or means" also includes materials which are heat sealable and, in this instance, the adjacent portions of the material must be brought into contact and then heat must be applied to effect the seal. The term "bonding material or means" also includes materials which are sonic sealable and vibratory sealable. The term "bonding material or means" when used herein also means a heat sealing lacquer or hot melt material which may be applied to the material and, in this instance, heat, sound waves, or vibrations, also must be applied to effect the sealing.

The term "bonding material or means" when used herein also means any type of material or thing which can be used to effect the bonding or connecting of the two adjacent portions of the material or sheet of material to effect the connection or bonding described herein. The term "bonding material or means" also includes ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal using a cold seal adhesive is utilized upon the material to form a sleeve. The term "bonding material or means" includes this cold seal adhesive. The cold seal adhesive adheres only to a similar substrate, acting similarly as a cohesive, and binds only to itself. The cold seal adhesive, since it adheres (or coheres) only to a similar substrate, does not cause a residue to build up on equipment, thereby permitting much more rapid disposition and use to form articles. A cold seal adhesive differs also from, for example, a pressure sensitive adhesive, in that a cold seal adhesive is not readily releasable.

The term "bonding material or means" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

The sleeve 12 may be constructed of a single layer of material 56 or a plurality of layers of the same or different types of materials 56. Any thickness of layer of material 56 may be utilized in accordance with the present invention as long as the sleeve 12 may be formed into at least a portion of a sleeve 12, as described herein, and as long as the formed sleeve 12 may contain at least a portion of a pot 30 or a floral grouping 46, as described herein. Additionally, an insulating material such as bubble film, preferable as one of two or more layers, can be utilized in order to provide additional protection for the item, such as the floral grouping 46, contained therein.

In one embodiment, the sleeve 12 may be constructed from two polypropylene films. The layers of material 56 comprising the sleeve 12 may be connected together or laminated or may be separate layers. In an alternative embodiment, the sleeve 12 may be constructed from only one of the polypropylene films.

The sleeve 12 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material 56 wrapped about at least a portion of the pot 30. This connecting engagement is preferably temporary in that the material 56 may be easily removed, i.e., the cling material "clings" to the pot 30.

The cling material is constructed and treated if necessary, from polyethylene such as Cling Wrap made by Glad®, First Brands Corporation, Danbury, Conn. The thickness of the cling material will, in part, depend upon the size of sleeve and pot 30 in the plant package 10, i.e., generally, the larger pot 30 therefore may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sleeve 12 is constructed from any suitable material 56 (said material 56 shown only in the form of a sleeve 12, but the material 56 having an upper surface, a lower surface, and an outer periphery) that is capable of being wrapped about a pot 30 or a floral grouping 46, and formed into a plant package 10 as described herein. Preferably, the material 56 comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material 56 comprising the sleeve 12 may vary in color. Further, the material 56 comprising the sleeve 12 may consist of designs or decorative patterns which are printed, etched, and/or embossed thereon using inks or other printing materials. An example of an ink which may be applied to the surface of the material 56 is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material 56 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the material 56 comprising the sleeve 12. Moreover, each surface of the material 56 used in constructing the sleeve 12 may vary in the combination of such characteristics. The material 56 utilized for the sleeve 12 itself may be opaque, translucent, transparent, or partially clear or tinted transparent.

Figure 6:
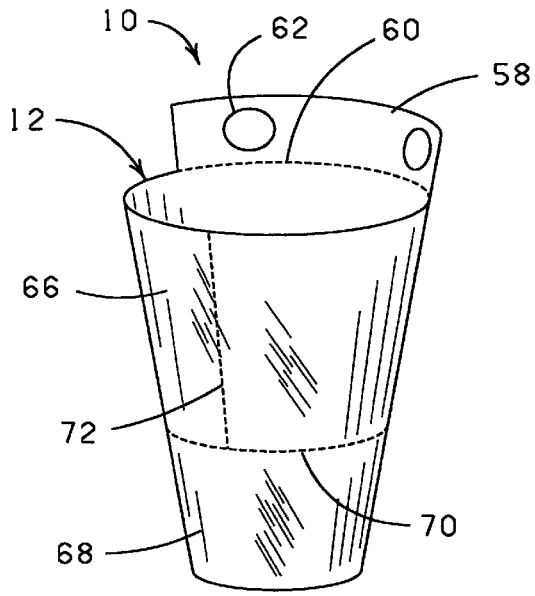
FIG. 6 is a perspective view of the plant package of FIG. 1 showing a sleeve having a detachable extension attached to a portion of the upper end of the sleeve, the extension having apertures therein.
Figure 7:
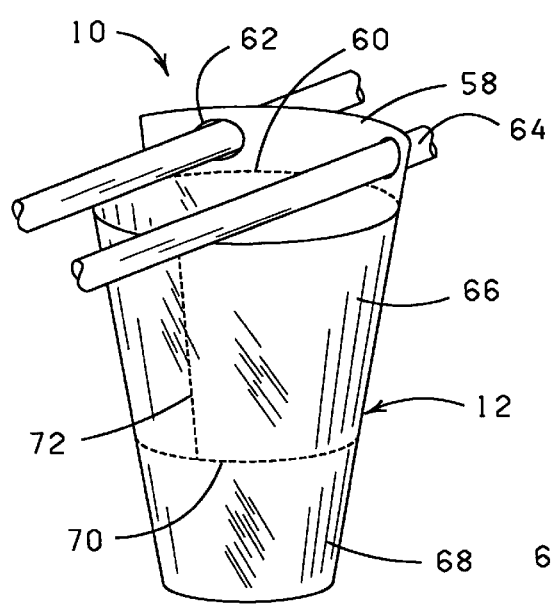
FIG. 7 is a perspective view of the plant package of FIG. 6 showing both the sleeve and the extension, rods extending through the apertures in the extension.

The sleeve 12 may further comprise an extension 58, as shown in FIGS. 6 and 7. The extension 58 has a plurality of perforations 60 (the plurality of perforation designated generally by the numeral 60) in the sleeve 12 near the first end 14. The extension 60 has one or more apertures 62 (only one aperture designated by the numeral 62) disposed therein. The apertures 62 permit the sleeve 12, or a complete plant package 10, to be placed on a rod or a set of rods 64, also known as wickets, (only one of the set of rods referred to herein by the numeral 64) for shipment, storage, assembly of the plant package 10, or other function known in the art.

The sleeve 12 further has an upper portion 66 and a lower portion 68 (FIGS. 1 and 3–9). The sleeve 12 also has detaching elements in preselected areas. "Detaching element," as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith. A plurality of generally circumferential perforations 70 (designated generally herein by the numeral 70) are disposed circumferentially about the sleeve 12 and divide the upper portion 66 of the sleeve 12 from the lower portion 68 of the sleeve 12. The upper portion 66 of the sleeve 12 has a plurality of vertical perforations 72 (designated generally herein by the numeral 72) which are disposed in a vertical line in the upper portion 66 of the sleeve, generally in a vertical line extending between the circumferential perforations 70 and the first end 14 of the sleeve 12. The upper portion 66 is separable from the lower portion 68 by tearing the upper portion 66 along both the vertical perforations 72 and the circumferential perforations 70, thereby detaching the upper portion 66 of the sleeve 12 from the lower portion 68 of the sleeve 12. The remaining lower portion 68 of the sleeve 12 remains disposed about the pot 30 and/or the floral grouping 46, (that is, the growing medium 47) forming a decorative plant cover 74 which substantially surrounds and encompasses the pot 30 or the growing medium 47 or other retaining medium (not shown) in which a floral grouping 46 is disposed.

It will be understood that the decorative plant cover 74, and the second decorative cover described in detail below may comprise all of the characteristics of the pot 30. That is, the decorative plant cover 74 (or the second decorative cover) may comprise both the decorative characteristics of a decorative cover, as well as the structural characteristics (not shown), namely, the decorative plant cover 74 (and the second decorative cover, described in detail below) have an upper end 32', a lower end 34', and an outer periphery 36' forming an outer surface 38'. An opening 40' intersects the upper end 32', forming an inner surface 42' and is defined by an inner periphery 44'. The lower end 34' of the decorative plant cover 74 is sometimes formed closed, therefore a retaining space 45' is formed and is defined by the inner surface 42' and the lower end 34'.

In a general method of use (FIGS. 1–2 and 8–10), an operator provides a sleeve 12, and a pot 30 having a floral grouping 46 disposed in a growing medium 47 contained within the pot 30. The operator then disposes the pot 30 having the floral grouping 46 therein into the sleeve 12 by opening the sleeve 12 at the first end 14 and assuring both that the opening 22 therein is in an open condition, and that the inner periphery 26 of the sleeve 12 is somewhat expanded outward as well, as shown in FIGS. 1, 2, and 8–10. The operator then disposes the pot 30 having the floral grouping 46 therein into the opening 22 in the sleeve 12 (not shown), the pot 30 being disposed generally through the upper portion 66 of the sleeve 12 into generally the lower portion 68 of the sleeve 12, the pot 30 remaining in the lower portion 68 of the sleeve 12, permitting the sleeve 12 to substantially surround and tightly encompass the pot 30. It will be understood that alternatively, the sleeve 12 with an extension 58, as shown schematically in FIGS. 6–7, may be utilized, the sleeve 12 being disposed on rods, or wickets, 64 (only one red/wicket being designated 64), and the pot 30 then being disposed in the sleeve 12 either before or after the rods 64 are disposed through the extension 58 of the sleeve 12.

Alternatively, the pot 30 could be placed on a support device such as a pedestal (not shown) and the sleeve 12, disposed underneath or astride the pot 30, could be pulled toward and over the pot 30 so as to substantially surround the pot 30 or at least a portion of the outer surface 38 of the pot 30. The bonding material disposed on the pot 30, the sleeve 12, or both could then serve to connect the sleeve 12 to the pot.

The floral grouping 46 extends from the growing medium 47 in the pot retaining space 45 (FIG. 2) into the upper portion 66 of the sleeve 12 (FIG. 8), the material 56 having sufficient flexibility but also sufficient rigidity to both remain in and sustain its generally tubular or frusto-conical shape, thereby substantially surrounding and encompassing the floral grouping 46, particularly the stem portion 50 and the bloom portion 48 of the floral grouping 46. When the pot 30 is disposed adjacent the inner surface 24 of the sleeve 12, in the lower portion 68 of the sleeve 12, the bonding material 54 disposed on the inner surface 24 of the sleeve 12 and/or the outer surface 38 of the pot 30 connects the sleeve 12 and the pot 30 together, thereby securely bonding the sleeve 12 to the pot 30, and/or the pot 30 to the sleeve 12, depending upon the disposition of the bonding material 54, as shown in FIGS. 3–5 and described in detail previously.

Figure 8:
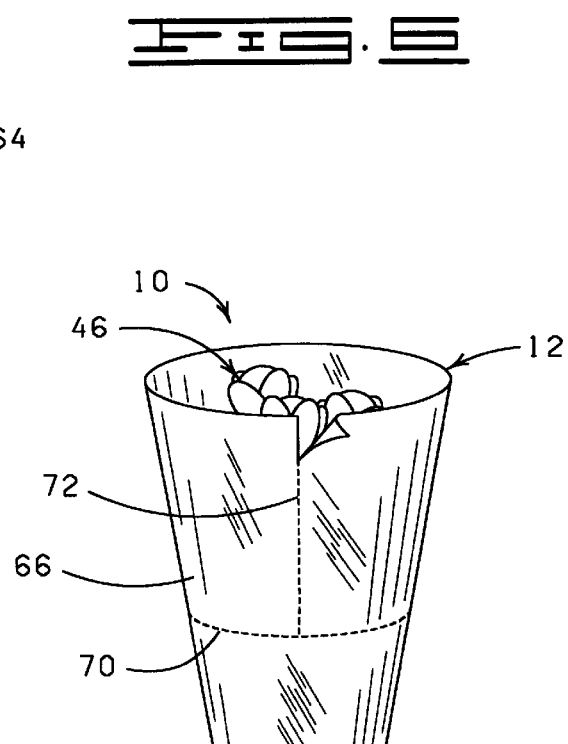
FIG. 8 is a perspective view of the plant package of FIG. 1 but showing a partial detachment of the vertical perforations in the upper portion of the plant package.
Figure 9:
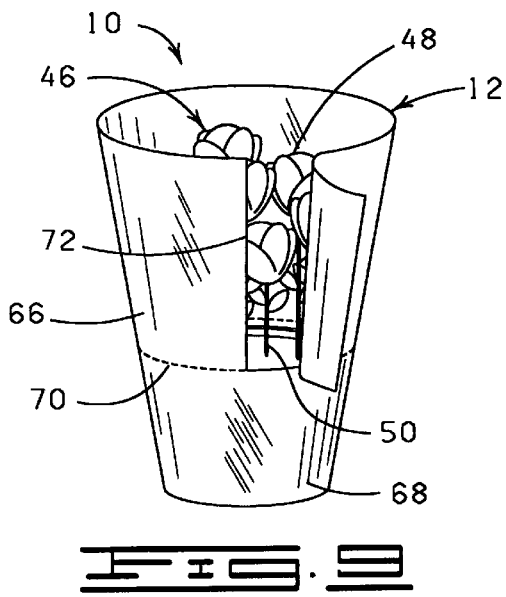
FIG. 9 is a perspective view of the plant package of FIG. 1 but showing the upper portion of the sleeve being detached from the lower portion via both the vertical perforations in the upper portion and the circumferential perforations.
Figure 10:
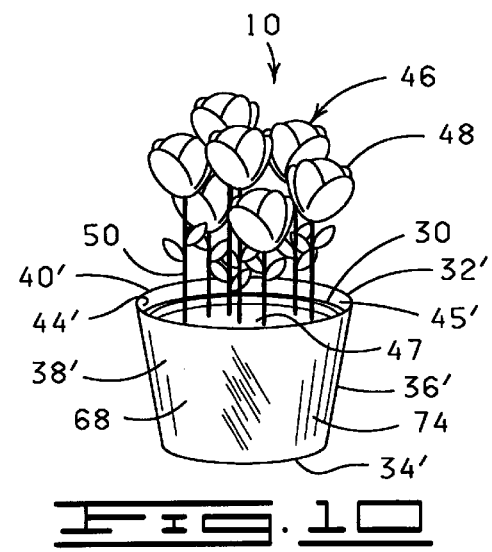
FIG. 10 is a perspective view of the plant package of FIG. 1 but showing the upper portion of the sleeve detached, the remaining lower portion forming a decorative plant cover.

To remove the upper portion 66 of the sleeve 12, by example, but not by way of limitation, the operator generally grasps the sleeve 12 near the vertical perforations 72 and pulls one side of the upper portion 66 of the sleeve 12 away from the line of vertical perforations 72 and downward, thereby causing the sleeve 12 to tear away along the vertical perforations 72, as shown in FIGS. 8–9. When the sleeve 12 has separated along the vertical perforations 72 to the circumferential perforations 70, the operator then pulls the sleeve 12 circumferentially about the pot 30, as illustrated in FIG. 9, thereby causing the sleeve 12 to tear or separate along the line of circumferential perforations 70. The upper portion 66 of the sleeve 12 is then discarded, leaving the lower portion 68 of the sleeve 12 which forms the decorative plant cover 74 disposed about the pot 30, and which is at least partially bondingly connected to the pot 30 (FIG. 10). The lower portion of the sleeve 12 which remains on the pot 30 may be equipped with a reservoir (not shown) to contain water, nutrients, preservatives, and/or hormones for nourishing the plant and/or floral grouping 46 after the sleeve portion has been removed.

Figure 11:
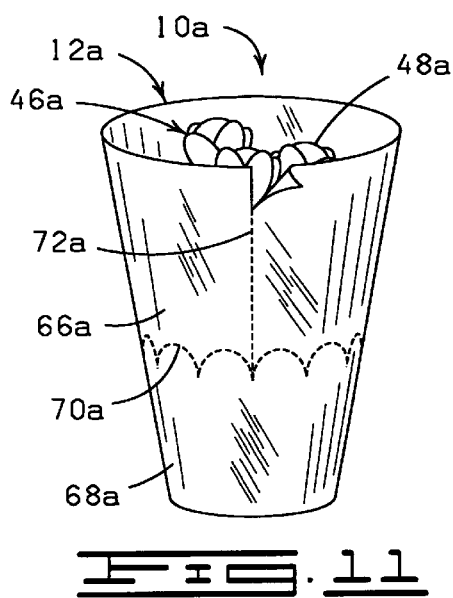
FIG. 11 is a perspective view of a modified plant package similar to the plant package shown in FIG. 1, but showing a scalloped design formed by the circumferential perforations.
Figure 12:
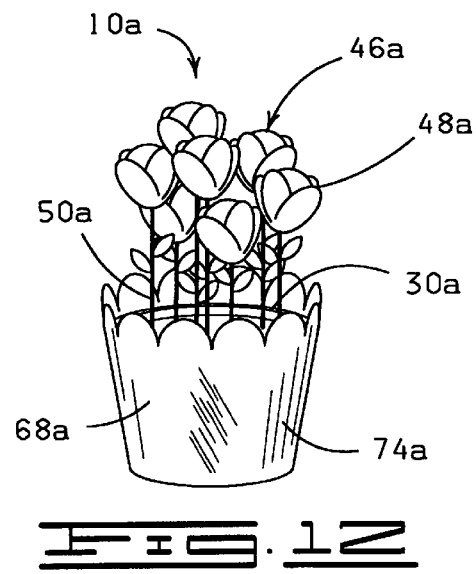
FIG. 12 is a perspective view of a the plant package of FIG. 9, showing the upper portion of the sleeve removed, and showing the remaining lower portion forming a decorative plant cover.

The Embodiments and Methods of Use of FIGS. 11–12

FIGS. 11–12 illustrate another embodiment and method of use of the present invention. The plant package 10a illustrated in this embodiment and used in this method are constructed exactly the same as the plant package 10 and sleeve 12 shown in FIGS. 1–10, and described in detail previously, except that the sleeve 12a is constructed so that the circumferential perforations 70a form a decorative design, namely, a scalloped design, as shown in FIGS. 11–12.

When the upper portion 66a of the sleeve 12a is removed by any method described herein or known in the art, the remaining lower portion 68a of the sleeve 12a forms a decorative plant cover 74a. It will be appreciated that the circumferential perforations 70a may form any decorative design, or combination of decorative designs. It will also be appreciated that additional decorative designs, created by the vertical perforations 72a and/or the circumferential perforations 70a, will suggest themselves when the plant package 10a is utilized by those having ordinary skill in the art.

The Embodiments and Methods of Use of FIGS. 13–17

FIGS. 13–17 illustrate another embodiment and method of use of the present invention. The plant package 10b illustrated in this embodiment and used in this method are constructed exactly the same as the plant package 10 and sleeve 12 shown in FIGS. 1–10 and described in detail previously, except that the sleeve 12b is constructed from a sheet of material 76 (not shown), such construction providing a sleeve 12 as described previously, except that the sleeve 12b has a modified second end 16 which is closed, thereby forming a base 28. (Such a sheet of material 76 is disclosed and described in U.S. Pat. No. 5,111,638 entitled "Method For Wrapping A Floral Grouping" issued to Weder et al., on May 12, 1992, which has been previously incorporated by reference herein.) In addition, the sleeve 12b formed from the sheet of material 76 has a plurality of overlapping folds 77, (only one of the plurality of overlapping folds designated by the numeral 77) which are formed by the use of a bonding material 54b on the material 56b forming the sleeve 12b, by the use of heat shrinkable material known in the art and commercially available, or by any device or mechanical means which forms sheet material into such a shape. Such mechanical means are disclosed in U.S. Pat. No. 4,773,182, entitled, "Article Forming System," U.S. Pat. No. 4,897,031, entitled, "Article Forming System," U.S. Pat. No. 5,208,027, entitled "Article Forming System," and U.S. Ser. No. 08/001,001, entitled "Covering for Flower Pot and Floral Grouping," allowed on Nov. 9, 1993, issue fee paid Jan. 31, 1994, all of which are hereby incorporated by reference herein.

Alternatively, gussets (not shown) are formed in the sheet of material 76 which permit the sheet of material 76 to be folded along the gussets and formed into the shape of the sleeve 12b, similar to the embodiment shown in FIGS. 13–17. Methods and means of forming gussets in sheet material, and folding sheet material, are known to those having ordinary skill in the art.

The sleeve 12b also differs from the sleeve 12, because the sleeve 12b has a circumferential overlapping fold 78 which extends circumferentially about the sleeve 12a, as shown in FIGS. 13–15. In this embodiment, a bonding material 54b is disposed generally both above and near the circumferential perforations 70b and below and near the circumferential perforations 70b. The bonding material 54b extends about the sleeve 12b in generally parallel alignment with the circumferential perforations 70b. The circumferential overlapping fold 78 is formed in this area. That is, a portion of the outer surface 20b of the sleeve 12b extending circumferentially around the sleeve 12b, near the circumferential perforations 70b, is folded under by tucking a portion of the outer surface 20b of the sleeve 12b (near the line of circumferential perforations 70a) under, thereby causing a portion of the inner surface 24b of the sleeve 12b to lie adjacent another portion of the inner surface 24b of the sleeve 12b (or, as shown schematically in FIG. 14), creating a first fold 80. This first fold 80 causes a first portion 82 of the outer surface 20b of the sleeve 12b having bonding material 54b thereon to overlap and lie adjacent a second portion 84 of the outer surface 20b of the sleeve 12b, the second portion 84 of the outer surface 20b also having a bonding material 54b thereon. The first portion 82 contacts the second portion 84 and the first and second portions 82 and 84 respectively, are bondingly connected, as shown schematically in FIG. 14. (It will be appreciated that the connection between the first portion 82 and the second portion 84 will likely be much closer than the connection schematically shown in FIG. 14). In this manner, the three-layer circumferential overlapping fold 78 is created in the sleeve 12b. The circumferential fold 78 remains in place until the upper portion 66b of the sleeve 12b is removed as described herein.

In a general method of use, when the upper portion 66b of the sleeve 12b is removed (FIG. 15) as shown and described in detail previously herein, the remaining portion of the circumferential overlapping fold 78 forms a skirt 86 which extends about, and outwardly from, the opening 88 on the lower portion 68b, in the resulting decorative plant cover 74b as shown in FIGS. 16 and 17. The position of the skirt 86 may be altered by an operator releasing the bonding material 54b connecting both the first portion 82 and the second portion 84 of the outer surface 20b of the sleeve 12b from its bonded position. The skirt 86 may be formed so as to turn upwardly, inwardly, horizontally (upward or inward), downwardly, vertically (either upward or downward) or in any combination thereof, or in any obtuse or arbitrary angle or combination thereof.

An operator simply pulls the first portion 82 away from the second portion 84. Then, the skirt 86 may be arranged at different angles, such as the angle shown in FIG. 16, with the skirt 86 extending downwardly and outwardly, or such as the angle shown in FIG. 17, showing the skirt 86 extending upwardly and outwardly. It will be appreciated that a variety of skirt angles may be created, such as, but not by way of limitation, a horizontally extending skirt 86, or an upwardly and inwardly extending skirt 86.

It will further be understood, by one having ordinary skill in the art, that the circumferential overlapping fold 78 permits the formation of such a skirt 86 as shown in FIGS. 16 and 17, that is, a skirt 86 which has a flare, and which is capable of being flared either outward, as illustrated, or inward (not shown). Further, the circumferential overlapping fold 78 protects the skirt 86 from being crushed or damaged before the upper portion 66b of the sleeve 12b is removed. Then, once the upper portion 66b is removed as described above, the operator may flare the skirt 86 as desired. It will be further appreciated that the circumferential overlapping fold 78 may overlap inward, toward the floral grouping 46b, rather than outward, as presently shown in FIGS. 13–15. Or, in a further alternative, a skirt 86 may be formed without any circumferential overlapping fold 78.

The Embodiments and Methods of Use of FIGS. 18–21

FIGS. 18–21 illustrate another embodiment and method of use of the present invention. The plant package 10c illustrated in this embodiment and used in this method are constructed exactly the same as the plant package 10 and sleeve 12 shown in FIGS. 1–10 and described in detail previously, except that the sleeve 12c has printed thereupon both a ribbon 90 pattern and a bow 92 pattern, said ribbon 90 pattern which extends about the outer periphery 18c of the sleeve 12c, in the lower portion 68c of the sleeve 12c. Alternatively, an actual bow 92 may be attached to the ribbon 90 via a bonding material 54c, rather than being printed upon the sleeve 12c as a bow pattern.

In a method of use, the upper portion 66c of the sleeve 12c is removed by any method described herein. The resulting decorative plant cover 74c, as shown in FIG. 20, has the appearance of having a ribbon 90 wrapped about and encircling the decorative plant cover 74c, (only the lower portion 68c of the sleeve 12c being shown), the ribbon 90 which is decoratively tied into a bow 92 (or alternatively a bow 92 being attached to the ribbon 90).

Figure 21:
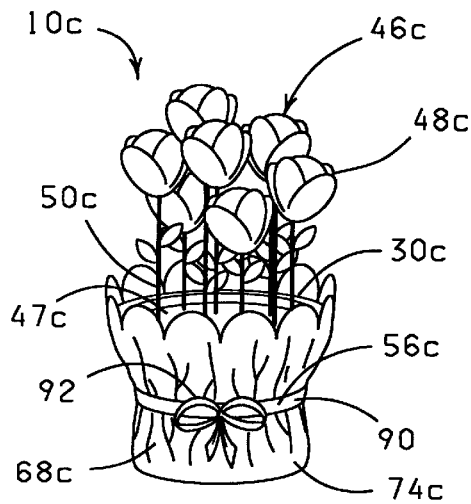
FIG. 21 is a perspective view of the plant package of FIG. 20, but showing the decorative plant cover crimped by the ribbon which extends thereabout.
Figure 22:
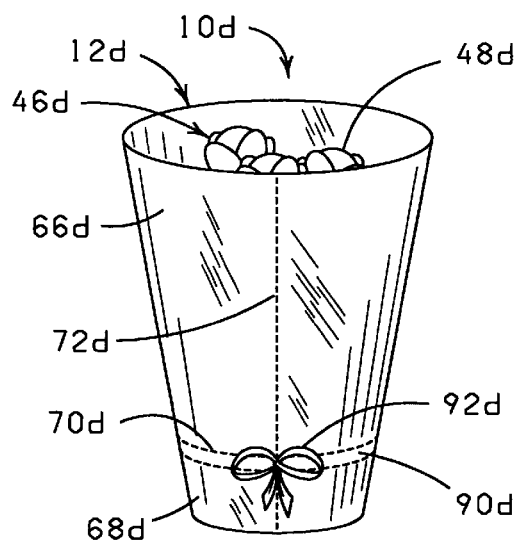
FIG. 22 is a perspective view of a modified plant package similar to the plant package shown in FIG. 1, but having the vertical perforations extending through both the upper portion and the lower portion of the sleeve, and having two parallel circumferential perforations which form a ribbon appearance thereabout with a bow, and further having a second decorative plant cover enclosed within the sleeve.
Figure 23:
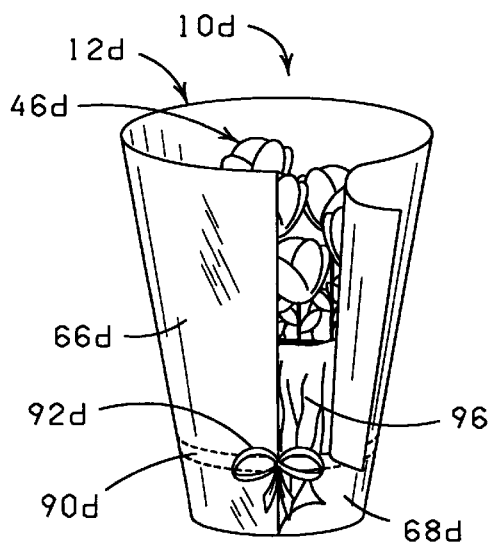
FIG. 23 is a perspective view of the plant package of FIG. 22, but showing both the upper portion and the lower portion of the sleeve being removed, the ribbon and bow remaining disposed about the second decorative plant cover.

FIG. 21 illustrates another embodiment and method of use of the present invention. The sleeve 12c has an actual ribbon 90 which extends circumferentially around the outer periphery 18c of the sleeve 12c in the lower portion 68c of the sleeve 12c, and an actual bow 92 which is attached to the ribbon 90 (or, alternatively, to the sleeve 12c, not shown). The ribbon 90 and bow 92 are connected to the sleeve 12c via a bonding material 54 (not shown). The ribbon 90 and/or bow 92 comprise any material 56c described herein or known in the art.

In a method of use, the ribbon 90 is connected to the sleeve 12c via the bonding material 54c in a manner which crimps the sleeve 12c somewhat in and near the ribbon 90. Crimping sheet material is well known in the art. For example, the ribbon 90 may comprise a heat shrinkable material (known in the art and commercially available), and the ribbon 90 may be placed in a condition to crimp the lower portion 68c of the sleeve 12c by exposing the ribbon 90 (either before or after the upper portion 66c of the sleeve 12c is removed) to a heat source sufficient to cause the ribbon 90 to shrink and thereby crimp the lower portion 68c of the sleeve 12c (such heat sources are known in the art and commercially available, such as, but not by way of limitation, a heat gun which blows heated air). The upper portion 66c of the sleeve 12c is removed by any means described herein, leaving the lower portion 68c forming a decorative plant cover 74c having a ribbon 90 which crimps the plant cover 74c about the pot 30c or the floral grouping 46c (or growing medium 47c), the ribbon 90 being tied into a bow 92, or a separate bow 92 being connected in any manner described herein to the ribbon 90 and/or the plant cover 74c. It will be appreciated that the ribbon 90 and/or bow 92 may be connected at any level of the pot 30c, or above the pot 30c, thereby crimping the plant cover 74c inward in a diameter smaller than the upper diameter of the upper end 32c of the pot 30c, or, alternatively, connecting the ribbon 90 and/or bow 92 at any level of the plant cover 74c which encompasses the pot 30c. Alternatively, the ribbon 90 and/or bow 92 is connected to the sleeve 12c without crimping, as shown in FIG. 20 and described previously.

After a pot 30c has been disposed in the sleeve 12c, by any method described herein, a crimped portion 94 is formed by the ribbon 90, the crimped portion 94 causing adjacent portions of the inner surface 24c and/or outer surface 20c of the lower portion 68c of the sleeve 12c to come together, the bonding material 54c on the ribbon 90c and/or sleeve 12c causing adjacent portions to be bonded together for forming the crimped portion 94. Crimping may be accomplished by hand or with a device or a machine as may be desired in a particular application. The crimped portion 94 may comprise only adjacent portions of the lower portion 68c of the sleeve 12c, or, alternatively, the crimped portion 94 of the lower portion 68c of the sleeve 12c may engage a portion of the pot 30c, the pot 30c having a bonding material 54c on the outer surface 38c thereof, the bonding material 54c on the pot 30c creating a crimped portion 94. Alternatively, any combination of the lower portion 68c of the sleeve 12c and/or the outer surface 38c of the pot 30c and/or the ribbon 90 which extends about the lower portion 68c of the sleeve 12c may create a crimped portion 94 of the lower portion of the sleeve, by hand or by any device or mechanical means known in the art. The crimped portion 94 engages a portion of the pot 30c for cooperating to maintain the lower portion 68c of the sleeve 12c assembled about and/or connected to the pot 30c.

The crimped portion 94 (FIG. 21) preferably extends circumferentially about the outer surface 38c of the pot 30c and/or floral grouping 46c (that is, primarily, the growing medium 47c). In some applications, it may be desirable to form the crimped portion 94 only at certain positions spaced circumferentially about the lower portion 68c of the sleeve 12c. Methods of crimping as also shown in copending applications U.S. Ser. No. 07/926,098, filed Aug. 5, 1992, entitled "Method and Apparatus For Forming a Decorative Cover"; U.S. Ser. No. 07/940,930, filed Sep. 4, 1992, entitled, "Flower Pot Cover With Crimped Portion"; and U.S. Ser. No. 095,331, filed Jul. 21, 1993, entitled, "Method For Crimping A Wrapper About a Floral Grouping", all of which are hereby specifically incorporated by reference herein.

In a further alternative, the sleeve 12c is constructed with more than one material 56c, so that the ribbon 90 portion forms an integral part of the sleeve 12c, but the ribbon 90c further comprises a material 56c different from the material 56c of the remainder of the sleeve 12c, such as but not by way of limitation, heat shrinkable material, as described previously. Such ribbon 90 may be shrunk to cause a crimping condition of a portion of the plant cover 74c (FIG. 21), as described above, or may remain unshrunk, as shown in FIG. 20. It will be appreciated that the sleeve 12c may also be formed with a closed bottom, as shown and described in detail herein previously.

Further, it will be appreciated that any ribbon 90 shown and/or described herein may comprise a band. The term "band" when used herein means any material which may be secured about an object such as a pot, or a sleeve, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering material to removably or substantially permanently form a crimped portion and secure the crimped portion formed in the material which may be secured about an object such as the pot. The band also may include a bow 92 if desired in a particular application.

In another embodiment of the present invention, the sleeve 12c may be free of a ribbon and bow pattern or of a ribbon and bow and thus in appearance may be similar to sleeve 12 indicated in FIG. 1, however the lower portion of the sleeve which surrounds the outer surface of the pot may be formable into a plant cover having a plurality of overlapping folds formed in a random or predetermined arrangement and style (not shown). In this embodiment, after the pot has been disposed into the retaining space 27c of the sleeve 12c, the lower portion 68c of the sleeve 12c is formed manually or automatically into a plurality of overlapping folds 72c (not shown) or pleats (not shown) thus giving the lower portion 68c of the sleeve 12c the appearance of a decorative cover 74c formed about the pot 30c. In other words, the lower portion 68c of the sleeve 12c is formed into a cover 74c with overlapping folds 77c in a manner similar to that described above when the sleeve 12c is crimped about the outer surface 38c of the pot 30c. The overlapping portions of the folds 77c may be connected by a bonding material 54c such as an adhesive or cohesive disposed upon the outer surface 20c of the sleeve 12c. Or, the overlapping portions of the folds 77c may be connected with a bonding material 54c such as an adhesive or cohesive applied to the inner surface 24c of the sleeve 12c. Alternatively, the bonding material 54c may be on the outer surface 38c of the pot 30c for causing portion of the sleeve 12c to bond to the pot outer surface 38c. Alternatively, the bonding material 54c may be disposed both on the outer surface 38c of the pot 30c and on the inner surface 24c or outer surface 20c of the sleeve 12c. Alternatively, the bonding material 54c may be disposed on both the inner surface 24c and outer surface 20c of the sleeve 12c but not on the outer surface 38c of the pot 30c. Alternatively, the bonding material 54c may be on both the inner and outer surfaces 24c and 20c, respectively, of the sleeve 12c and on the outer surface 30c of the pot 30c.

Another method in which overlapping folds 77c may be formed in the lower portion 68c of the sleeve 12c in the lower portion 68c of the sleeve 12c is showing in the co-pending U.S. patent application Ser. No. 07/927,891, entitled "Cover Forming Apparatus Having Pivoting Forming Members" filed on Aug. 10, 1992 and allowed on Aug. 27, 1993, issue fee paid Nov. 24, 1993.

The lower portion 68c of the sleeve 12c may be formed into a portion having folds 77c either before or after the removable upper portion 66c of the sleeve 12c has been detached from the remaining lower portion 68c (not shown). After the upper portion 66c of the sleeve 12c has been removed, the remaining lower portion 68c of the sleeve 12c now constitutes a decorative cover 74c. The decorative cover 74c, as noted comprises a plurality of overlapping folds 77c. The cover 74c may be removable from the pot 30c, or may be firmly connected to the outer surface 38c of the pot 30c by a bonding material 54c disposed, as noted above, either on the outer surface 38c of the pot 30c or on the inner surface 24c of the sleeve 12c.

It will also be understood by one of ordinary skill in the art that the sleeve may have a portion which forms a skirt 86c (not shown), such that when the removable upper portion 66c of the sleeve 12c is detached, a decorative plant cover 74c with a skirt 86c remains.

The Embodiments and Methods of Use of FIGS. 22–29

FIGS. 22–29 illustrate another embodiment and method of use of the present invention. The plant package 10d illustrated in this embodiment and used in this method are constructed exactly the same as the plant package 10c shown in FIGS. 18–21 and described in detail previously, except that the vertical perforations 72d extend below the circumferential perforations 70d into the lower portion 68d, the pot 30d is used and exposed, an underlying second decorative plant cover 96 (identical to the previously described plant cover 74 or, alternatively, either a flower pot cover known in the art, or, in a further alternative, the pot 30d), and is contained within the sleeve 12d, and the circumferential perforations 70d comprise two parallel lines of circumferential perforations 70d (only one line of circumferential perforations designated by the numeral 70d). A ribbon 90d and bow 92d are utilized in this embodiment and method, and may comprise any ribbon 90d and/or bow 92d shown and/or described herein, or known in the art.

Figure 24:
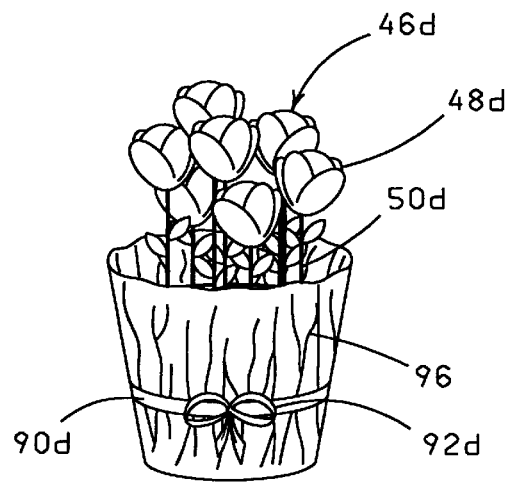
FIG. 24 is a perspective view of the plant package of FIG. 22, but showing both the upper portion and the lower portion of the sleeve removed, the ribbon and bow remaining disposed about the second decorative plant cover.
Figure 25:
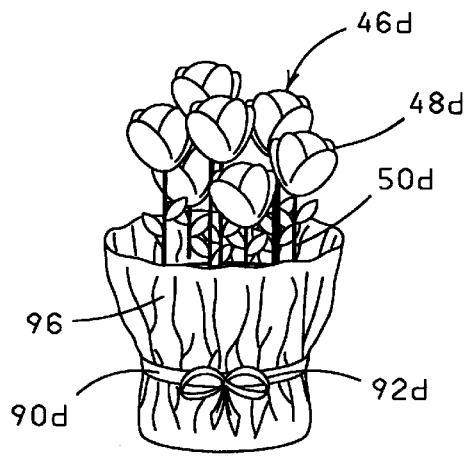
FIG. 25 is a perspective view of the plant package of FIG. 22, but showing both the upper portion and the lower portion of the sleeve removed, the remaining ribbon and bow extending about and crimping the remaining second decorative plant cover.

The sleeve 12d may be completely removed, except for the ribbon 90d and bow 92d section. The ribbon 90d may extend about the second decorative plant cover 96, as shown in FIG. 24, in a non-crimped condition. Alternatively, the ribbon 90d may extend about the second plant cover 96 in a crimped condition, as shown in FIG. 25, and as previously described herein.

Figure 26:
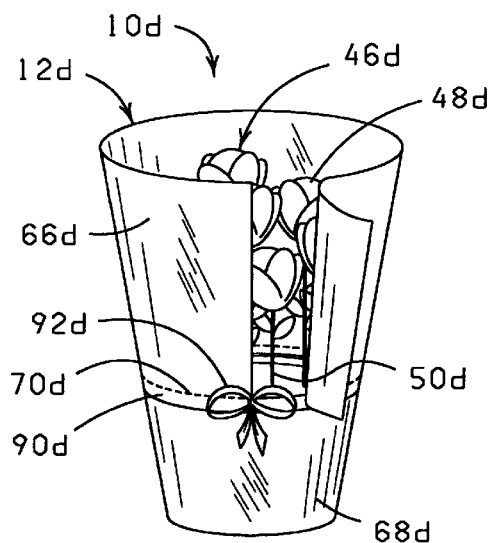
FIG. 26 is a perspective view of a modified plant package similar to the plant package shown in FIG. 22, but showing the vertical perforations extending only through the upper portion and only one circumferential perforation, the upper portion shown as partially detached from the lower portion.
Figure 27:
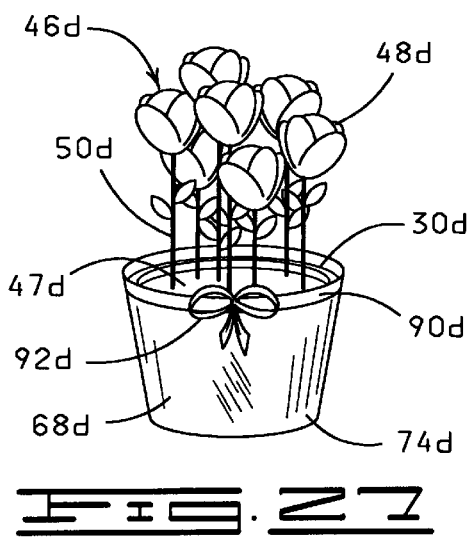
FIG. 27 is a perspective view of the plant package of FIG. 26, but showing the upper portion removed, the lower portion forming a decorative plant cover having a bow with a ribbon extending thereabout.
Figure 28:
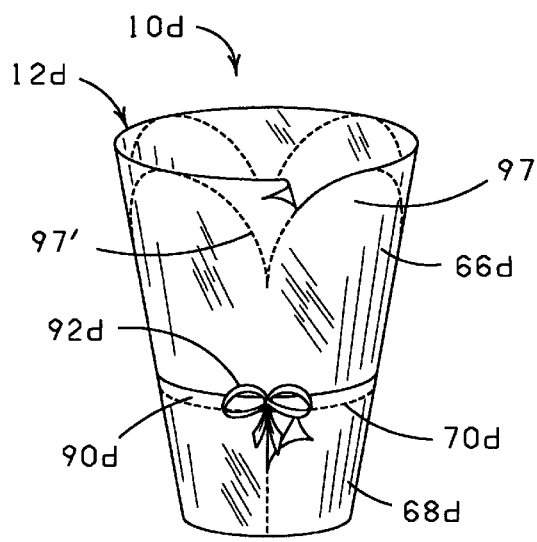
FIG. 28 is a perspective view of a modified plant package similar to the plant package shown in FIG. 22, but showing a plurality of decorative perforations defining a plurality of decorative sections in the upper portion, the upper portion having no vertical perforation, only a single circumferential perforation, the lower portion having a vertical perforation shown partially detached, and with one of the plurality of decorative perforations shown as partially detached as well.
Figure 29:
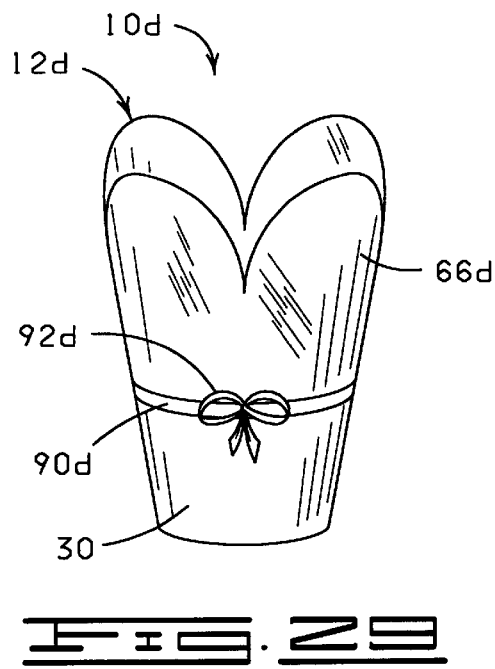
FIG. 29 is a perspective view of the plant package of FIG. 28, but showing the lower portion removed, the upper portion having the plurality of decorative sections removed, forming a decoration in the upper portion having a ribbon and bow, and, along with the pot, together forming a decorative plant cover.

Alternatively, the upper portion 66d of the sleeve 12d may be removed, by any method described herein, and the lower portion 68d of the sleeve 12d may remain about at least a portion of the second plant cover 96 (not shown or pot 30d) as a decorative plant cover 74d (FIGS. 26–27). In a further alternative, the lower portion 68d of the sleeve 12d is removed while the upper portion 66d remains in place, forming a skirt 86d (FIGS. 28–29). The upper portion 66d comprises a plurality of decorative sections 97 (only one section designated 97) defined by a plurality of decorative perforations 97' (only one perforation designated 97). The decorative perforations 97' are torn away in a method previously described herein and known in the art, leaving the decorative sections 97 in the upper portion 66d of the sleeve 12d. In still a further alternative, no second decorative plant cover 96 is utilized, that is, only the pot 30d with the floral grouping 46d therein is used. The upper portion 66d of the sleeve 12d is removed via any method described herein, leaving the ribbon 90d and/or bow 92d as well as the lower portion 68d of the sleeve 12d which together with the ribbon 90d and/or bow 92d forms a decorative plant cover 74d about the pot 30d (FIGS. 26–27). It will be appreciated that the sleeve 12d may also be formed with a closed second end, as shown and described in detail herein previously.

Figure 30:
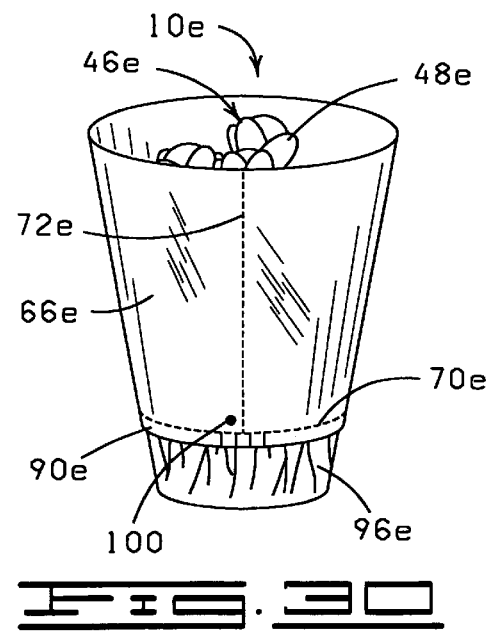
FIG. 30 is a perspective view of a modified plant package similar to the plant package of FIGS. 22–25, but showing a sleeve having only an upper portion and a ribbon and a pull bow having a pull portion attached to the upper portion of the sleeve.
Figure 31:
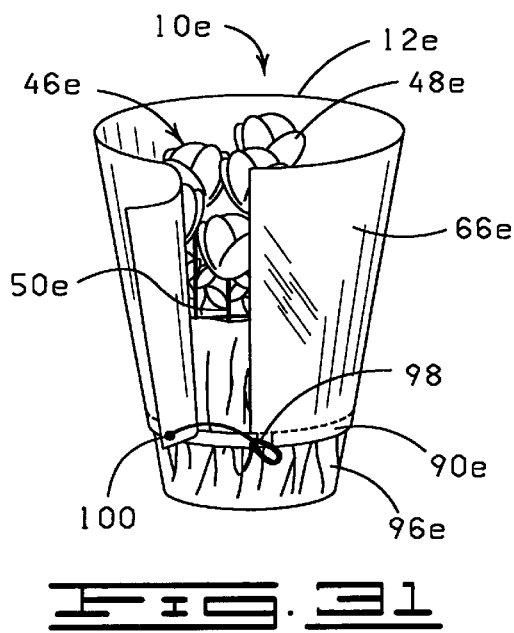
FIG. 31 is a perspective view of the plant package of FIG. 30, but showing the upper portion of the sleeve being removed, the pull portion of the pull bow acting to cause loops to be formed in the bow section.
Figure 32:
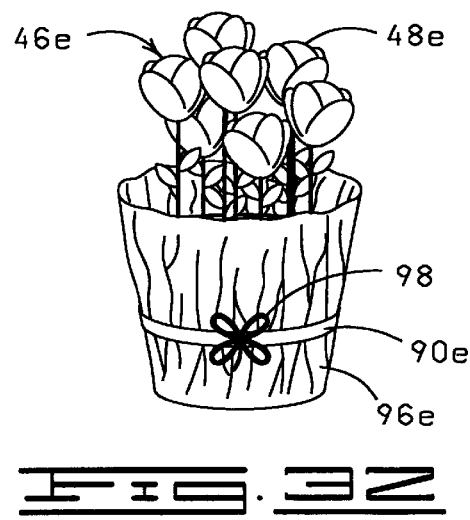
FIG. 32 is a perspective view of the plant package of FIG. 31, but showing both the upper portion of the sleeve removed, the ribbon remaining disposed about the second decorative plant cover, the pull portion detached and the pull bow formed into a plurality of loops.

The Embodiments and Methods of Use of FIGS. 30–32

FIGS. 30–32 illustrate another embodiment and method of use of the present invention. The plant package 10e illustrated in this embodiment and used in this method are constructed exactly the same as the plant package 10d shown in FIGS. 22–29 and described in detail previously, except that the sleeve 12e comprises only the upper portion 66e and a ribbon 90e and bow 92e, the bow 92e comprises a pull bow 98 having a pull portion 100 attached to the upper portion 66e of the sleeve 12e, so that when the sleeve 12e is removed, the pull portion 100 pulls the pull bow 98 into a plurality of decorative loops (shown schematically using four loops shown in FIG. 32). The pull portion 100 is detachable from the pull bow 98 once the pull bow 98 is formed into the plurality of loops. The ribbon 90e may comprise any ribbon shown and/or described herein.

In a method of use, the upper portion 66e of the sleeve 12e is detached by any method described herein. The pull portion 100 causes ribbon within the pull bow 98 to gather into the plurality of decorative loops, the beginning of this operation being shown in FIG. 31, as the upper portion 66e of the sleeve 12e is pulled away. The pull portion 100 is detached from the pull bow 98 by any method known by those having ordinary skill in the art, leaving a second decorative plant cover 96e having a ribbon 90e extending thereabout, and having a multiple loop pull bow 98, as illustrated in FIG. 32. It will be appreciated that the ribbon 90e may crimp the second decorative plant cover 96d, as previously described herein. Further, it will be appreciated that the ribbon 90e and/or pull bow 98 may be utilized with any embodiment shown and/or described herein. In such variations, the pull portion 100 of the pull bow 98 may be attached to the upper portion 66e of the sleeve 12e, the lower portion 68e of the sleeve 12e, or may be unattached, so that an operator may pull the pull section 100 to form the pull bow 98 without detaching any portion of the sleeve 12e, or only the upper portion 66e, or, in a further alternative, only the lower portion 68d.

As shown in FIGS. 30–32, the plant package 10e comprises a pot 30e and a plant cover 96e which is disposed about the pot 30e. It will be understood by a person of ordinary skill in the art that the plant cover 96e shown in FIGS. 30–32 is only one of a number of versions of plant covers which may be employed in the invention described herein. In particular, the plant cover 96e may be formed from a sheet of material which is formed into a cover about the outer surface of the pot 30e either by hand or automatically, as previously described herein. The plant cover 96e may or may not further comprise a skirt. The plant cover 96e may be a preformed plant cover such as one produced by the method described in U.S. Pat. No. 4,773,182, incorporated by reference above. The plant cover 96e may have a plurality of overlapping folds as indicated in FIGS. 30–32. Alternatively, the body of the plant cover 96e may be substantially free of overlapping folds and may have the appearance of a sleeve. The bottom of the plant cover 96e may be flattened, gusseted, or simply sealed along an edge.

The plant cover 96e may have a bonding material 54e (not shown) disposed upon a portion thereof, including either the inner surface 42e' or outer surface 38e' or both the inner 42e', surface and outer surface 38e', for attaching either to the pot 30e, or to the sleeve 12e, or to both the pot 30d and the sleeve 12e. Alternatively, the plant cover 96e may be free of a bonding material 54e. The sleeve 12e applied to the pot 30e/plant cover 74e assembly may have a bonding material 54e disposed either on the inner surface 24e or the outer surface 20e, or both the inner surface 24e and outer surface 20e, for bonding to the plant cover 96e. Alternatively, the sleeve 12e may be free of a bonding material 54e on any surface thereof. Although the sleeve 12e in FIGS. 30–32 is shown as having a pull bow 98, it will be understood by one of ordinary skill in the art that the sleeve 12e may be free of a pull bow 98 and that which a portion of the sleeve 12e is detached, the portion of the sleeve 12e that may be left surrounding the plant cover 96e may simply function to cause the plant cover 96e to be bound more firmly about the outer surface 38e' of the plant cover 96e, or it may provide a decorative function as well as described elsewhere herein.

As noted herein, the sleeve 12 may have perforations in various patterns to facilitate removal of portions or a portion of the sleeve 12 or of the entire sleeve 12. The sleeve 12 may have other means as described elsewhere herein for facilitating the removal of a portion or portions of the sleeve 12, or of the entire sleeve 12.

In a final embodiment (not shown), the plant package 10 may comprise a pot 30 having a floral grouping 46, and the sleeve 12 may comprise only the lower portion 68 (the sleeve 12 having no perforations therein, or detaching elements), a portion of the sleeve near the first end 14 and opening 22 extending away from the sleeve 12, said portion forming a decorative skirt 86 when positioned about the pot 30. The sleeve 12 is positionable about the pot 30 and the sleeve 12 closely surrounds and encompasses the pot 30 when positioned about the pot 30. It will be understood that either the sleeve 12 and/or the skirt 86 may have overlapping folds 77 or gussets (not shown) which permit the formation of the skirt 86. Alternatively, no overlapping folds 77 or gussets may be utilized. In a further alternative, a wider portion of the sleeve 12 may be cut from the material 56 forming the sleeve 12, which assists in the formation of the skirt 86. The decorative skirt 86 is positionable it differing angles, as described previously herein. It will be appreciated that the sleeve 12 may be provided with a bonding material 54 disposed thereupon, the pot 30 may be provided with a bonding material 54 disposed thereupon, or both the sleeve 12 and the pot 30 may have a bonding material 54 disposed thereupon, as previously described herein. Further, the skirt 86 may also have a bonding material 54 disposed thereupon, on either surface of the decorative skirt 86.

In a method of use, the pot 30 is positioned within the sleeve 12, as previously described herein, and the combination of the sleeve 12 and the decorative skirt 86 form a decorative plant cover 74. It will be appreciated that at least a portion of the plant cover 74 substantially surrounds and encompasses the pot 30.

Changes may be made in the construction and the operation of the various components, elements and assemblies described herein or in the steps or the sequence of steps of the methods described herein without departing from the spirit and scope of the invention as defined in the following claims.

What is claimed is:

1. A method of covering a pot having an outer surface and containing a floral grouping, comprising the steps of:

providing a flattened preformed flexible tubular sleeve comprising an adhesive or cohesive bonding material disposed upon a portion thereof, said preformed flexible tubular sleeve being positionable about the pot;

disposing the pot within the preformed flexible tubular sleeve, wherein a portion of the preformed flexible tubular sleeve is positioned adjacent the pot, and bondingly connecting said portion of the preformed flexible tubular sleeve to the outer surface of the pot via the adhesive or cohesive bonding material on the preformed flexible tubular sleeve wherein said portion of the preformed flexible tubular sleeve closely conforms to the outer surface of the pot; and wherein said portion of the preformed flexible tubular sleeve is positioned about the pot and connected thereto such that said portion of the preformed flexible tubular sleeve remains disposed about the pot and substantially surrounds and encompasses the pot.

2. The method of claim 1 wherein in the step of providing a preformed flexible tubular sleeve, the preformed flexible tubular sleeve is further defined as having a first end, a second end, an outer periphery which forms an outer surface, the preformed flexible tubular sleeve having an opening which intersects both the first and second end forming an inner surface defined by an inner periphery which forms a retaining space.

3. The method of claim 2 wherein in the step of providing a preformed flexible tubular sleeve having an opening, the opening intersects the first end and the second end is closed.

4. The method of claim 1 wherein in the step of providing a preformed flexible tubular sleeve, the preformed flexible tubular sleeve is constructed from a material selected from the group consisting of paper (untreated or treated in any manner), cellophane, foil, polymer film, fabric (woven or nonwoven or synthetic or natural), burlap, cloth, and any combination thereof.

5. The method of claim 1 wherein in the step of providing a preformed flexible tubular sleeve, the preformed flexible tubular sleeve further comprises a thickness in a range of between about 0.1 mil and about 30 mil.

6. The method of claim 1 wherein in the step of providing a preformed flexible tubular sleeve, the preformed flexible tubular sleeve further comprises a material having two or more layers.

7. The method claim 1 wherein in the step of providing a preformed flexible tubular sleeve, the preformed flexible tubular sleeve further comprises an extension, the extension having at least one aperture.

8. The method of claim 1 wherein in the step of providing a preformed flexible tubular sleeve, the preformed flexible tubular sleeve further comprises a ribbon and a bow.

9. The method of claim 1 wherein in the step of providing a pot, the pot further comprises an upper end, a lower end, and an outer periphery forming an outer surface, the pot having an opening which intersects the upper end forming an inner surface and defined by an inner periphery which forms a pot retaining space.

10. The method of claim 1 wherein in the step of providing a pot, the pot is a flower pot.

11. The method of claim 1 wherein in the step of providing a floral grouping, the floral grouping further comprises the group consisting of growing medium, botanical items, propagules, and any combination thereof.

12. A method of covering a pot having an outer surface and having an adhesive or cohesive bonding material disposed upon a portion thereof and containing a floral grouping, comprising the steps of:

providing a flattened preformed flexible tubular sleeve which is positionable about the pot;

disposing the pot within the preformed flexible tubular sleeve, wherein a portion of the preformed flexible tubular sleeve is positioned adjacent the pot, and bondingly connecting said portion of the preformed flexible tubular sleeve to the outer surface of the pot via the adhesive or cohesive bonding material on the pot, wherein said portion of the preformed flexible tubular sleeve closely conforms to the outer surface of the pot; and wherein said portion of the preformed flexible tubular sleeve is positioned about the pot and connected thereto such that said portion of the preformed flexible tubular sleeve remains disposed about the pot and substantially surrounds and encompasses the pot.

13. The method of claim 12 wherein in the step of providing a preformed flexible tubular sleeve, the preformed flexible tubular sleeve is further defined as having a first end, a second end, an outer periphery which forms an outer surface, the preformed flexible tubular sleeve having an opening which intersects both the first and second end forming an inner surface defined by an inner periphery which forms a retaining space.

14. The method of claim 13 wherein in the step of providing a preforming flexible tubular sleeve having an opening, the opening intersects the first end and the second end is closed.

15. The method of claim 12 wherein in the step of providing a preformed flexible tubular sleeve, the preformed flexible tubular sleeve is constructed from a material selected from the group consisting of paper (untreated or treated in any manner), cellophane, foil, polymer film, fabric (woven or nonwoven or synthetic or natural), burlap, cloth, and any combination thereof.

16. The method of claim 12 wherein in the step of providing a preformed flexible tubular sleeve, the preformed flexible tubular sleeve further comprises a thickness in a range of between about 0.1 mil and about 30 mil.

17. The method of claim 12 wherein in the step of providing a preformed flexible tubular sleeve, the preformed flexible tubular sleeve further comprises a material having two or more layers.

18. The method claim 12 wherein in the step of providing a preformed flexible tubular sleeve, the preformed flexible tubular sleeve further comprises an extension, the extension having at least one aperture.

19. The method of claim 12 wherein in the step of providing a preformed flexible tubular sleeve, the preformed flexible tubular sleeve further comprises a ribbon and a bow.

20. The method of claim 12 wherein in the step of providing a pot, the pot further comprises an upper end, a lower end, and an outer periphery forming an outer surface, the pot having an opening which intersects the upper end forming an inner surface and defined by an inner periphery which forms a pot retaining space.

21. The method of claim 12 wherein in the step of providing a preformed flexible tubular sleeve, the preformed flexible tubular sleeve further comprises a bonding material.

22. The method of claim 12 wherein in the step of providing a floral grouping, the floral grouping further comprises the group consisting of growing medium, botanical items, propagules, and any combination thereof.

* * * * *

UNITED STATES PATENT AND TRADEMARK OFFICE
CERTIFICATE OF CORRECTION

PATENT NO. : 6,047,524
DATED : April 11, 2000
INVENTOR(S) : Donald E. Weder

It is certified that error appears in the above-identified patent and that said Letters Patent is hereby corrected as shown below:

Drawings,
FIG. 29, delete "30" and associated line.

Column 1,
Lines 33, 37, and 66, after word "of" and before word "the" delete word "a".

Column 6,
Line 25, change phrase "sleeve 12" to phrase "material 56".

Column 8,
Line 47, change phrase "red/wicket" to phrase "rod/wicket".

Column 13,
Line 63, after word "surface" change number "30c" to number -- 38c --.
Line 65, delete phrase "in the lower portion 68c of the sleeve 12c".
Line 66, after number "12c" change word "is" to word -- as --.

Column 14,
Line 54, delete the phrase "second plant cover 96 (not shown or"; and delete the parentheses after the number "30d".
Line 61, after word "designated" change number "97" to number -- 97' --.

Column 16,
Lines 1 and 2, change phrase "inner 42e', surface" to -- inner surface 42e' --.
Line 42, after word "positionable" change word "it" to word -- in --.

Column 18,
Line 35, change word "and" to words -- and/or --.

UNITED STATES PATENT AND TRADEMARK OFFICE
CERTIFICATE OF CORRECTION

PATENT NO. : 6,047,524
DATED : April 11, 2000
INVENTOR(S) : Donald E. Weder

It is certified that error appears in the above-identified patent and that said Letters Patent is hereby corrected as shown below:

Column 18 (cont),
Line 44, after word "method" and before word "claim" add word -- of --.

Signed and Sealed this

Sixth Day of July, 2004

JON W. DUDAS
*Acting Director of the United States Patent and Trademark Office*